United States Patent [19]

Friggstad

[11] Patent Number: 4,653,592
[45] Date of Patent: Mar. 31, 1987

[54] FLEXIBLE WINGED CULTIVATOR

[75] Inventor: Terrance Friggstad, Saskatoon, Canada

[73] Assignee: Flexi-Coil Limited, Saskatoon, Canada

[21] Appl. No.: 765,277

[22] Filed: Aug. 13, 1985

[30] Foreign Application Priority Data

Aug. 15, 1984 [CA] Canada ................................. 461063

[51] Int. Cl.4 ............................................. A01B 73/02
[52] U.S. Cl. ..................................... 172/311; 172/677
[58] Field of Search ............... 172/311, 456, 776, 310, 172/657, 676, 677; 280/411 R, 411 A, 476 R, 476 A, 656

[56] References Cited

U.S. PATENT DOCUMENTS

| | | | |
|---|---|---|---|
| 1,866,912 | 7/1932 | Schwab | 280/411 A |
| 3,240,508 | 3/1966 | Clausen et al. | 172/310 X |
| 3,487,882 | 1/1970 | Burton | 280/411 A X |
| 3,517,751 | 6/1970 | Morkoski | 172/657 X |
| 4,044,842 | 8/1977 | Worick | 172/776 X |
| 4,058,170 | 11/1977 | Ankenman et al. | 172/311 |
| 4,105,077 | 8/1978 | Seifert, Jr. | 172/311 |
| 4,109,928 | 8/1979 | Watkins | 172/311 X |
| 4,350,211 | 9/1982 | Coufal | 172/311 |
| 4,355,689 | 10/1982 | Friggstad | 172/311 |
| 4,396,069 | 8/1983 | Ferber et al. | 172/310 |

Primary Examiner—Richard T. Stouffer
Assistant Examiner—Terrence L. B. Brown
Attorney, Agent, or Firm—D. Ron Morrison

[57] ABSTRACT

A ground working implement consisting of a hitch, a center section pivotally secured to the hitch for rotation about a transverse axis and a two part wing section pivotally secured to each side of the center section for rotation about a longitudinal axis, with the two parts joined on a diagonal axis, a transverse member across the central region of the hitch, a member pivotally secured between the wing section and the end of a bar such that the rotational movement of the wing parts about a diagonal axis, the rotation of the complete wing about a longitudinal axis, and the rotation of the hitch about a transverse axis, is permitted during ground cultivation, and when the wing section is raised vertically for transportation purposes, the hitch becomes rigid with the center section and movement about all axis is locked.

4 Claims, 4 Drawing Figures

FLEXIBLE WINGED CULTIVATOR

This invention relates to new and useful improvements in ground working implements and it is of particular use in such implements as cultivators.

Relatively wide implements are used in present day cultivation where large acreages are involved, to reduce the time taken to cultivate a field. Advantage can also be taken of the relatively high powered tractors now available.

While it is conventional to provide several cultivator sections hinged together, nevertheless, with deep tillage cultivators in particular, it is increasingly difficult to incorporate the necessary flexibility of movement between adjacent sections in order to eliminate uneven depth penetration.

In a conventional cultivator, a center section is supported through a hitch and in relatively wide machines, the outer sections of the cultivator can twist relative to the center section and result in an uneven depth of tillage. This problem has been partly overcome by the cultivator as disclosed in Canadian Pat. No. 1,092,879 issued Jan. 6, 1981, inventor Terrance Friggstad, and corresponding U.S. Pat. No. 4,355,689. In this patent, the center section of the cultivator is rigidly fixed to the hitch, side wing sections are rotatable about a longitudinal axes at each side of the center section and additional side wing sections are rotatable about an axis which is diagonal to the first flexible side sections. This diagonal axis accommodates most of the flexing which occurs across the width of the cultivator.

The center section of the cultivator however is still rigidly attached to the hitch and is not permitted to follow the contour of the ground, and there is therefore a requirement for a cultivator in which all units are secured so that they more nearly follow the contour of the ground and provide a better cultivating action with even depth penetration.

The present invention provides a cultivator in which the hitch is pivoted to the center unit of the cultivator, and in which the first side wing sections nearest to the center section are pivoted about a longitudinal axis in a manner such that when the cultivator is folded up in well known fashion to be transported upon roads, the hitch is automatically locked to the center section by the geometry of the frame members between the center section and the nearest side wing sections. This feature can also be incorporated in cultivators as small as three section cultivators.

In the preferred embodiment of the invention, in order to accommodate extreme ground undulating conditions, the sections beside the center section are provided with pivots so that the section can flex through its central region along a substantially diagonal axis.

Preferred embodiments of the invention will now be described with reference to the accompanying drawings in which.

Figure 1:
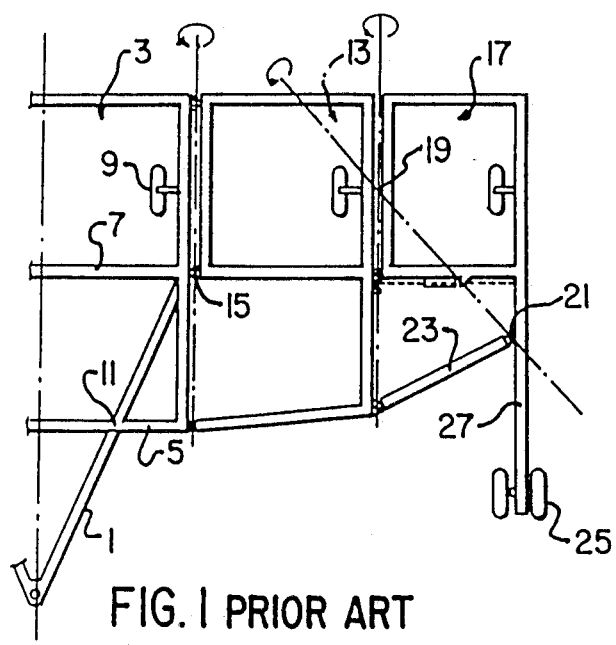
FIG. 1 is a schematic top plan view of the frame of a prior art cultivator.

Referring to the drawings, in FIG. 1 the prior art is disclosed in Canadian Pat. No. 1,092,879 previously referred to.

This prior art frame has a hitch 1 rigidly secured to the center section 3 which consists of an outer frame 5, an inner transverse member 7 and support wheel 9. A bolt 11 holds hitch 1 securely to frame 5. A second or inner wing section 13 is pivotally secured through pivots 15 to the center section 3. A third or outer wing section 17 is pivotally secured to the second section 13 through pivots 19 and 21 and is held in position by member 23 which is pivotally secured at both ends. A pair of wheels 25 on outrigger 27 steady the third section 17. It is seen that section 13 is therefore pivoted along a longitudinal axis, and section 17 is pivoted about axes respectively longitudinal and diagonal to section 13.

Figure 1A:
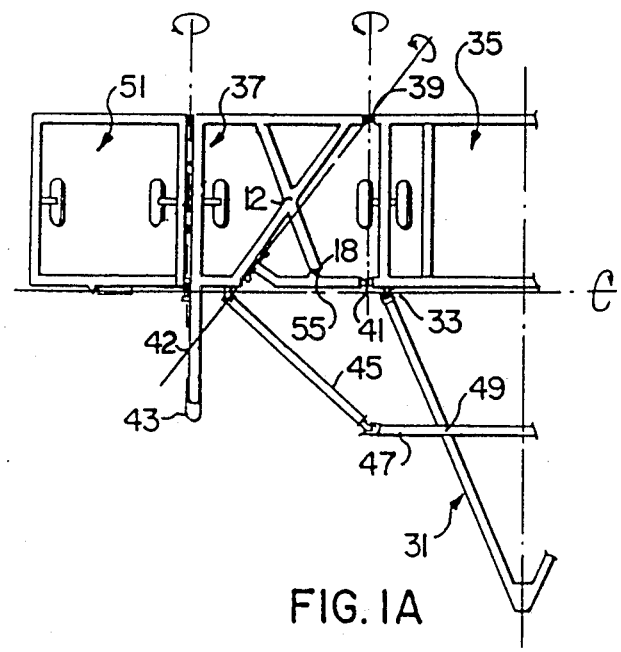
FIG. 1A is a schematic top plan view of the frame of a first embodiment of the cultivator of this invention.

The improved apparatus as shown in FIG. 1A has a pitch 31 pivotally secured through pivot or connection 33 to central unit 35 to permit pivoting, relative to the hitch, during operation. Second section 37 is secured to the first section 35 through pivots 39 and 41 to permit rotation about a longitudinal axis, section 37 having an outrigger 42 with wheels 43 for steadying the unit. A member 45 is also pivotally secured between the section 37 and a hitch member 47 which is rigidly secured to the hitch by means of a bolt 49.

The third section 51 is similar to the third section of the prior art, except the third section includes only the provision for rotating about a parallel (longitudinal) axis.

Figure 2:
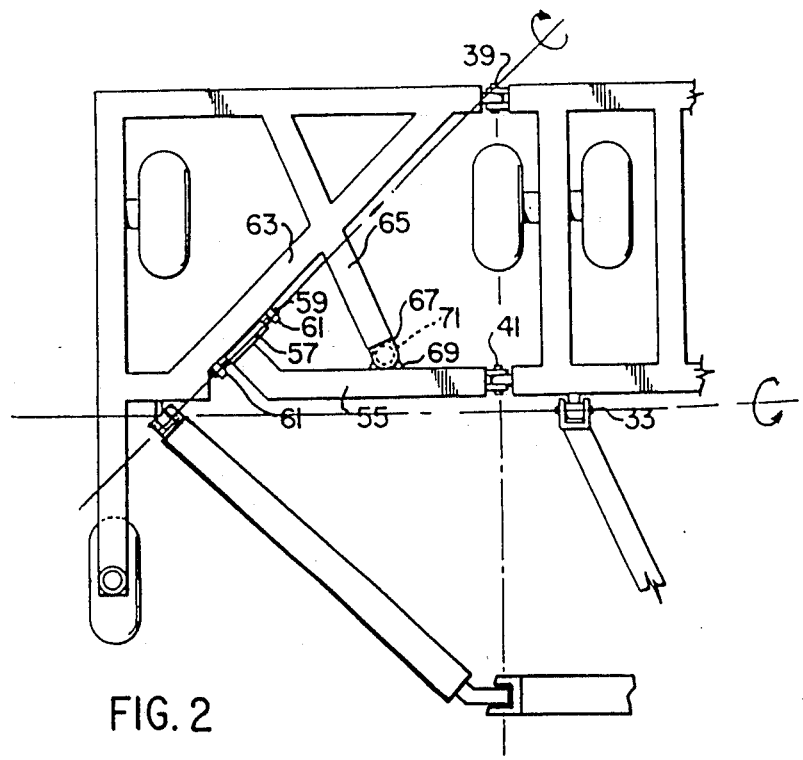
FIG. 2 is a schematic enlarged fragmentary top plan view of one of the flexible sections of the embodiment of the cultivator as shown in FIG. 1A.

The second section is however further modified from the prior art to include a forward frame member 55 which is flexibly mounted within the section as more specifically shown in FIG. 2. At the left hand end of member 55 there is secured a pipe 57 through which a rod 59 passes, this rod being supported upon brackets 61 which are welded to a diagonal cross member 63. This connection permits rotative movement and sliding movement between the left hand end of member 55 and member 63. A second diagonal cross member 65 ends in a spring support part 67 which cooperates with a spring support part 69 secured to the member 55. Between spring support parts 67 and 69 there is a coil spring 71. This mounting of the member 55 thus permits twisting of section 37 about a diagonal axis when rough ground conditions are encountered.

Figure 3:
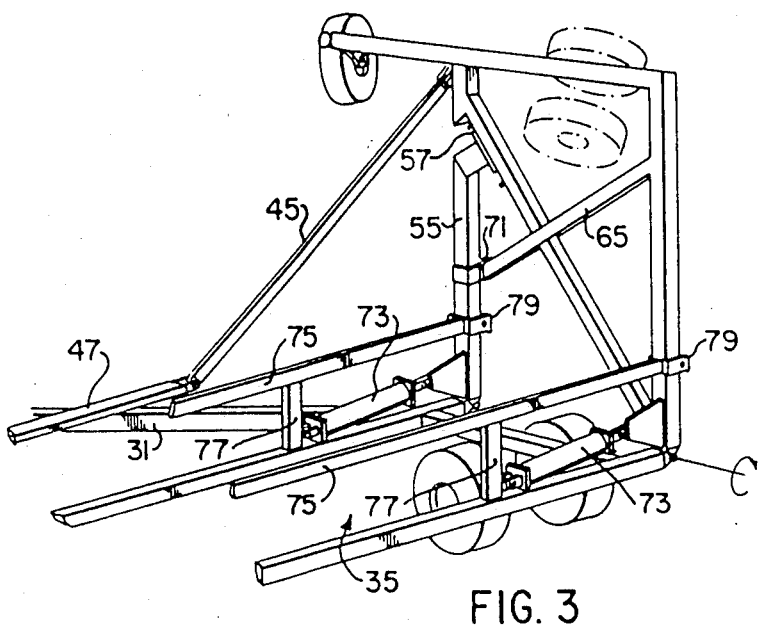
FIG. 3 is a fragmentary isometric projection showing the frame of a further embodiment of the cultivator of FIG. 1A in folded travelling position.

When it is wished to transport the cultivator on a road for instance, the sections are folded along their longitudinal hinges in the conventional manner utilizing hydraulic actuators 73 (FIG. 3); however it will be noted that, as the center section 35 is pivotally mounted to the hitch 31, rigidity between the hitch and the center section is required. This is provided by member 45 which swings upwardly with section 37, as shown in FIG. 3, and forms a triangulation effect which freezes the connection 33 between the hitch and the center section so that the center section will then be held rigidly to the hitch. The geometry of the frame thus makes it possible to have a floating center section during cultivating and a rigid center section during transportation.

For steadying purposes, transverse members 75 can also be used as shown in FIG. 3, these being welded upon posts 77 which are secured to section 35. The members 75 have U-shaped ends 79 into which the transverse frame members of section 37 can be accommodated and held in place by hydraulic actuators 73.

The invention will be limited only by the scope of the following claims.

The embodiment of the invention in which an exclusive property or privilege is claimed are defined as follows:

1. A ground working implement comprising:
   (1) a hitch
   (2) a center section which is a frame having front, two side, and rear members, pivotally secured to the hitch for rotation about a transverse axis,
   (3) two wing sections pivotally secured to the two side members respectively of the center section for rotation about respective longitudinal axes,
   (4) a transverse bar member across the central region of the hitch,
   (5) a member pivotally secured at each of its ends and connecting one of said wing sections and a respective end of the bar member such that rotational movement of the wing section about a transverse axis is permitted during ground cultivation and, when the wing sections are raised vertically for transportation purposes, the hitch becomes rigid with the center section, and wherein each wing section adjacent the center section has bracing comprising two diagonal cross members and a front frame member of the wing section which is pivotally attached to, and able to slide relative to, a forward end of one of the cross members of the bracing while the forward end of the second cross member of the bracing is resiliently secured to the said wing section front frame member, so that the wing section can flex through its central region along a substantially diagonal axis.

2. The implement of claim 1, wherein attached outrigger wheels are positioned forwardly of the wing sections for stabilising purposes.

3. The implement of claim 1 wherein the pivotal attachment of the wing section front frame member at one end to one said wing section cross member is a pipe attached to the wing section front frame member transverse to its outer end, and the forward end of said one cross member of the bracing has a rod supported upon brackets attached to said one cross member, the rod passing through the pipe to provide a sliding and pivoting bearing.

4. The implement of claim 1 wherein the forward end of the second cross member of the bracing is secured to the said wing section front frame member by resilient means which comprises a coil spring which is held between spring support means attached respectively to the second cross member of the bracing and the said wing section front frame member.

* * * * *